G. W. TILTON.

Assignor by mesne assignments to himself, M. SELLERS, and J. PENKETH.

LOCOMOTIVE FIRE-BOX.

No. 7,519. Reissued Feb. 20, 1877.

Witnesses
C. L. Parker
Jno. S. Murray

Inventor George W. Tilton
By Attorney for him and his
assignees George H. Christy

N. PETERS, PHOTO-LITHOGRAPHER, WASHINGTON, D. C.

UNITED STATES PATENT OFFICE

GEORGE W. TILTON, OF CHICAGO, ILL., ASSIGNOR, BY MESNE ASSIGNMENTS, TO HIMSELF, MORRIS SELLERS, AND JAMES PENKETH.

IMPROVEMENT IN LOCOMOTIVE FIRE-BOXES.

Specification forming part of Letters Patent No. 174,097, dated February 29, 1876; reissue No. 7,519, dated February 20, 1877; application filed February 7, 1877.

*To all whom it may concern:*

Be it known that I, GEORGE W. TILTON, of Chicago, county of Cook, State of Illinois, have invented or discovered a new and useful Improvement in Locomotive Fire-Boxes; and I do hereby declare the following to be a full, clear, concise, and exact description thereof, reference being had to the accompanying drawing, making a part of this specification, in which like letters indicate like parts.

Figure 1:
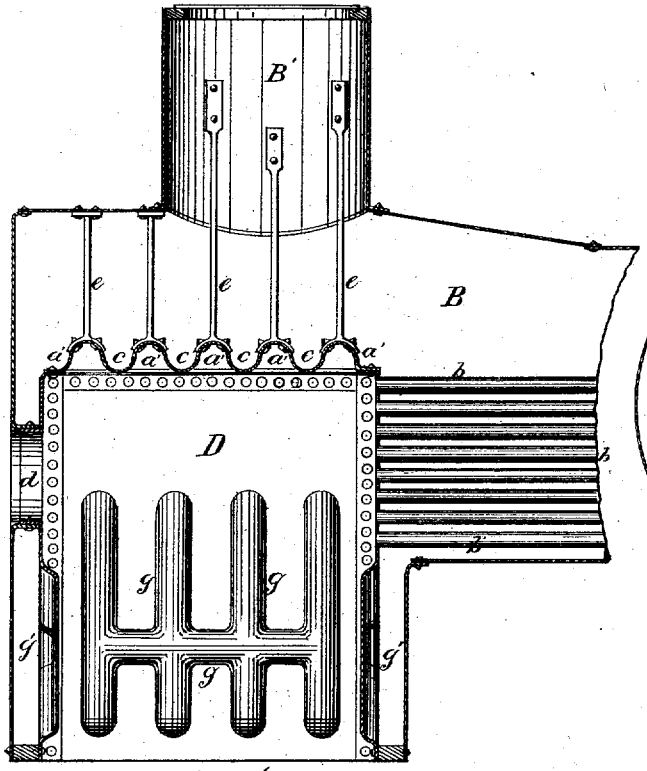
Figure 2:
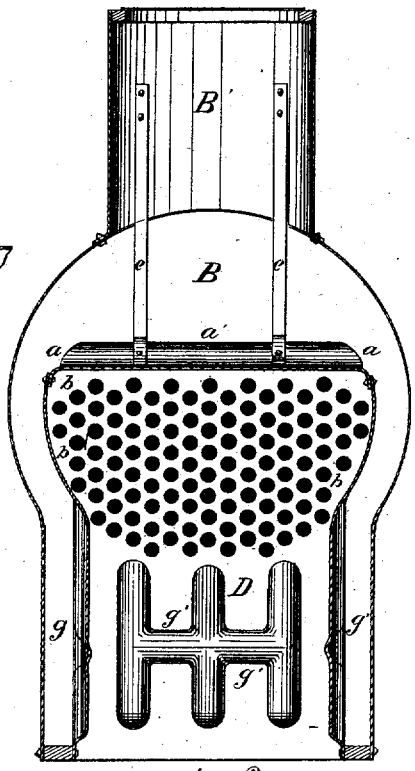
Figure 3:
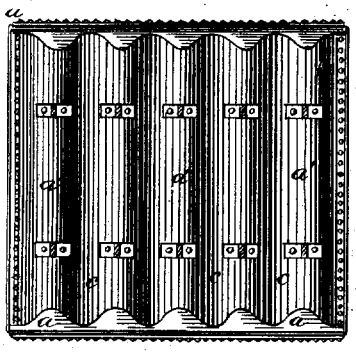
Figure 4:
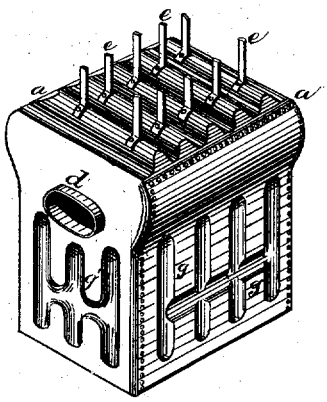

Figure 1 is a longitudinal sectional elevation of the rear end of a locomotive-boiler and fire-box, illustrative of my improvement. Fig. 2 is a transverse sectional elevation of the same. Fig. 3 is a top or plan view of the fire-box detached, and Fig. 4 shows the fire-box in perspective.

My improvement relates to the construction of the ordinary fire-box of locomotive or other similar boilers, the top or crown sheet of which is rectangular in form, and horizontal or nearly so, and is united along its rectangular edge by a line of riveting to the side and end sheets. Such a crown-sheet, in order to withstand the strain to which it is subject in use, and be as durable as possible, has been made with curved or arching crown-bars and tie-rods or braces, which construction involves great expense, and is objectionable on account of the difficulty of removing sedimentary deposits and crusts, which accumulate under the crown-bars, and around and between the tie rods or braces. Such crown-sheets have, also with a view to increased strength and rigidity, been corrugated; but in such cases some part of the upper corrugated surface lay below the riveted edges of the crown-sheet, so that each depression formed by the corrugations constituted a trough, in which sediment gathered, and incrustation took place with the usual result of the destruction of the crown-sheet.

By my improvement I make the crown-sheet of the fire-box corrugated over the greater part of its otherwise horizontal surface, but with the lower parts or troughs on the upper surface, even with or a little above the straight edges, by which a riveted joint is made with the sides of the box. In this way I secured a maximum of elasticity, stiffness, and rigidity, dispense with the necessary use of crown-bars, and leave the ends of the troughs open, so that by a free circulation of the water therein little or no sediment will be deposited or incrustation take place, and whatever is so deposited or formed, may, on account of ease of access, be readily removed. To make the side sheets equally strong I also corrugate them, as shown and described.

In the drawing, B represents a locomotive-boiler, with the usual flues *b* and dome B′. The fire-box D is of the general form and size commonly used in American locomotives. It is made with the usual door *d*, and flue-holes for the flues *b*, and is to be provided with the usual means for supporting the fuel and regulating combustion. The crown-sheet *a* is made with a series of corrugations, *a′*, raised above its surface, and extending over the whole or the greater part of its otherwise horizontal surface, but with a plain or flanged edge for riveting to the side and end sheets. Between each two raised corrugations thus made there will be a trough or depression, *c*, the bottom of which will be even with or a little above the riveting-edge of the sheet, and the ends of which will be open, so that a free circulation of water may take place lengthwise along such troughs, whereby the tendency of of sediment to deposit or of incrustation to take place, will be largely, if not wholly, obviated; and as I thus make a crown-sheet so strong and rigid that crown-bars and their connections can be wholly dispensed with, I keep the top of the fire-box practically unobstructed, so that such sediment and crust as are deposited and form thereon may be easily removed every time the locomotive goes off duty, if so desired. The fire-box thus made is attached by the usual hangers *e* and other fastenings. In order to make the side and end sheets equally strong and durable, I also corrugate them with any desired arrangement of corrugation, but preferably as shown, with corrugations *g g′* transverse to or crossing each other. In practical use different parts of the side and end sheets become heated to different degrees of temperature with a resulting inequality in the amount and direction of expansion and contraction caused thereby. The corrugation or corrugations then, which cross the line of strain, act somewhat as a spring to take up the slack caused by expansion, or to provide for shortening caused by contraction so as to compensate for or afford relief against all undue or irregularly-acting strains. With such corrugations crossing each other, every possible line of strain will be crossed or intersected by a rib or corrugation, so that the tendency to crack is reduced to a minimum.

I make no claim to the dome-shaped fire-box made with a continuous corrugation over the arch of the dome and down the sides of the box. My improvement does not relate at all to that class of fire-boxes, but only to those having in general shape a rectangular form, such as is common in the American locomotive, and to which the features described can be conveniently and usefully applied.

I claim as my invention—

1. In a rectangular fire-box, a corrugated crown-sheet, having an uncorrugated riveting-edge, the plane of such edge being even with or below the depressions *c*, substantially as and for the purposes set forth.

2. The rectangular fire-box D, having the corrugated crown-sheet *a*, as described, and corrugated side and end sheets, as described.

3. A fire-box, side or end sheet, corrugated with corrugations transverse to or crossing each other in the same side or end, substantially as set forth.

In testimony whereof I hereunto set my hand.

GEORGE W. TILTON.

Witnesses:

ROBERT ANTHONY,
W. S. MILLIGAN.